United States Patent Office 3,772,379
Patented Nov. 13, 1973

3,772,379
PREPARATION OF DIALKALI DIHYDROXY-BENZENE DISULFONATES
Paul E. Woodgate, Rochester, N.Y., assignor to Eastman Kodak Company, Rochester, N.Y.
No Drawing. Filed Oct. 28, 1971, Ser. No. 193,562
Int. Cl. C07c 143/44, 143/46
U.S. Cl. 260—512 R                5 Claims

ABSTRACT OF THE DISCLOSURE

A process for the preparation of dialkali dihydroxybenzene disulfonates which consists in dissolving an appropriate dihydroxybenzene in concentrated sulfuric acid. To this mixture fuming sulfuric acid is added and then to this mixture is added an amount of an alkali metal base sufficient to cause crystals of the dialkali dihydroxybenzene disulfonate to precipitate from the mixture.

FIELD OF THE INVENTION

The present invention relates to a process for the preparation of dialkali metal dihydroxybenzene disulfonates.

BACKGROUND OF THE INVENTION

In sulfonation processes of the type conventionally used to produce the dialkali dihydroxybenzene disulfonates such as disodium dihydroxybenzene disulfonates, the usual procedure has been to neutralize the entire reaction mixture. This includes a large amount of unreacted sulfuric acid. The total mixture of the sulfonation products and the unreacted sulfuric acid is conventionally neutralized with an alkali metal or ammonium base and the diverse dialkali sulfates, alkali bisulfates and dihdyroxybenzene sulfonate salts are subsequently separated by fractional crystallization or other relatively difficult means. Such methods of separating and isolating the dialkali dihydroxybenzene disulfonates from the acid neutralization products involve numerous and laborious handling steps as well as the utilization of large amounts of normally highly caustic and relatively expensive alkali bases.

It has been proposed in U.S. Pat. 3,547,988 to eliminate the long neutralization steps by reacting together a strongly acidic aqueous solution of dihydroxybenzene disulfonic acid and sulfuric acid of a pH of less than 2 with an alkali base. Only enough base to precipitate the disulfonate is added and such amount being less than enough to raise the pH above 2. Large quantities of dialkali dihydroxybenzene disulfonate have been produced by this method. This method shortened the production time substantially but did not increase the percentage yield substantially.

SUMMARY OF THE INVENTION

It is therefore an object of the present invention to provide an improved process for preparing dialkali dihydroxybenzene disulfonates. A further object of this invention is to provide a process for preparing dialkali dihydroxybenzene disulfonates of increased yields. An additional object of this invention is to provide a process for preparing dialkali dihydroxybenzene disulfonates of improved quality.

These and other objects and advantages of this invention are obtained by dissolving an appropriate dihydroxybenzene in concentrated sulfuric acid. To this mixture fuming sulfuric acid is added. Water is then added to the mixture and then an alkali metal base is added to the mixture. The amount of base added is that necessary to cause crystals of the dialkali dihydroxybenzene to precipitate from the mixture.

DETAILED DESCRIPTION OF A PREFERRED EMBODIMENT

According to a preferred embodiment, the present invention provides for the dissolution of a dihydroxybenzene in concentrated sulfuric acid. Examples of the dihydroxybenzene are catechol (1,2-dihydroxybenzene), resorcinol (1,3-dihydroxybenzene) and hydroquinone (1,4-dihydroxybenzene). Dissolution is aided by heating the acid and dihydroxybenzene mixture. After dissolution the solution is reacted with fuming sulfuric acid (containing excess $SO_3$) to form a dihydroxybenzene disulfonic acid product. This product is then reacted with an amount of an alkali metal base sufficient to cause crystals of the dialkali dihydroxybenzene disulfonate to precipitate from the mixture while it is still strongly acidic, the amount of the base added being less than that required to raise the pH of the resulting acidic liquor above 2.

As stated above, any of the dihydroxybenzenes are suitable for sulfonation to provide the dihydroxybenzene disulfonic acid which is subsequently reacted. Catechol (1,2-benzenediol) may be sulfated with fuming sulfuric acid. The fuming sulfuric acid should generally contain from about 10% to about 65% free sulfur trioxide, and preferably from about 25% to about 50% free sulfur trioxide.

After the fuming sulfuric acid has been added to the dihydroxybenzene sulfuric acid mixture, the reaction mixture temperature is raised from about 60° C. to about 90° C. for a period of from about 1 to about 3 hours. The sulfuric acid disulfonic acid mixture may be diluted with about 100 cc. of water per 100 g. of sulfuric acid present prior to the addition of the alkali metal base.

The particular type of alkali metal base which is added is not of critical importance, however, certain of the alkali metal bases show definite advantages over others. For example, the alkali metal hydroxides are preferred since they react more readily with the disulfonic acids formed by the reaction of the dihydroxybenzene with sulfuric acid. Hence, sodium hydroxide, potassium hydroxide and lithium hydroxide are specifically preferred.

The reactions that take place in the formation of the dialkali dihydroxybenzene disulfonates are thought to be as follows:

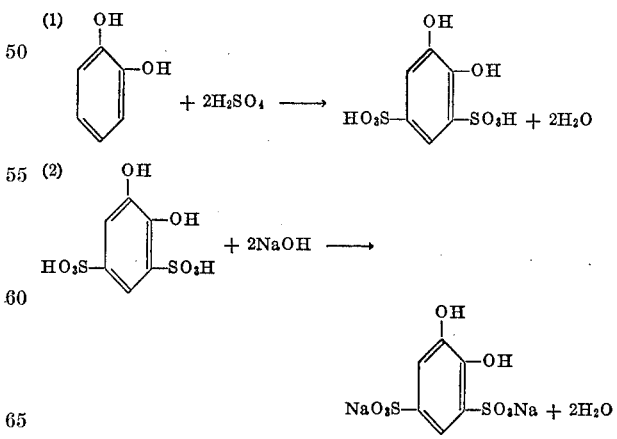

Thus, as is clear from the above reaction, although the exact mechanism for the formation of the disulfonic acid is not certain, two moles of sodium hydroxide must generally be added to each mole of the free disulfonic acid in order to yield complete conversion of the dihydroxybenzene disulfonic acid to the corresponding dialkali dihydroxybenzene disulfonate (in the instance 3,5-disodium pyrocatechol disulfonate).

Although the alkali base which is added to the reaction mixture may be in a solid or crystalline form, it is preferred that the alkali base be added as a solution. Sufficient alkali base is added to neutralize the sulfonic acid groups, but only that amount that is sufficient because if additional base is added, the entire reaction mixture will be neutralized. In such event, undesired alkali sulfates and bisulfates will be formed and they will be precipitated with the desired product. The amount necessary to be added is determined by conventional ultraviolet analysis.

Preferably about ½ to about 2 moles of the base are added per mole of free sulfonic acid to preferentially form the dialkali salt which is subsequently precipitated in a substantially pure form upon bringing the reaction mixture to the proper temperature.

Subsequent to the addition of the alkali metal base, the reaction mixture temperature is brought to about 88° C. to hydrolyze any sulfate ester which may be present and then the reaction mixture may be cooled to precipitate the desired dialkali dihydroxybenzene disulfonate. The cooling temperature is preferably about 5° C. and may range up to about 30° C.

The product which precipitates under these conditions is in a very high state of purity without further refining by recrystallization. The yield is better than 85% of theoretical with the product having an improved color and density when compared with product obtained by prior art processes.

The process as described above and as shown in the following examples is carried out in shorter time because in the prior art the dihydroxybenzene had to be added to the fuming sulfuric acid in a series of steps over a long period of time whereas by dissolving the dihydroxybenzene in sulfuric acid the fuming sulfuric acid may be added to the solution in less than one hour. The process of this invention uses less fuming sulfuric acid than the prior art; using about 75% of that required by the prior art processes which results in a savings.

The following examples will serve to further illustrate the process of this invention.

Example I

To a glass-lined reactor is added 120 kg. of concentrated sulfuric acid. The reactor is purged with nitrogen and a slow nitrogen flow is maintained during the subsequent steps. The sulfuric acid is cooled to 10° C. and 60 kg. pyrocatechol is added to the stirred acid over 15 minutes. The temperature is raised to 54° C. to dissolve the pyrocatechol in the acid. With water cooling on the reactor jacket 222 kg. of 30% oleum is added portion-wise over one hour while the temperature of the reaction mixture is maintained at 60–71° C. The mixture is heated to 88° C. and the temperature is maintained for two hours. The mixture is cooled to 38° C. and with water cooling on the jacket, distilled wtaer (330 liters) is added over one hour. With continued cooling, just enough 50% sodium hydroxide solution (87 kg.) is added to neutralize the sulfonic acid groups. The mixture is heated to 88° C. to hydrolyze any sulfate ester which may be present. The mixture is cooled to 4° C. overnight and the liquors are decanted from the crystals of 3,5-disodium pyrocatechol disulfonate. The crystals are washed three times with ethanol, centrifuged and vacuum dried. The yield was 90% of theoretical.

Example II

To a one-liter flask was added 120 g. of concentrated sulfuric acid at 25° C. Without cooling, 40 g. of resorcinol was slowly added to the flask. The temperature rose slowly to about 65° C. An additional 100 g. of concentrated sulfuric acid was added and 20 g. of resorcinol was added. 222 g. of 30% oleum was added to the reaction mixture. The mixture was then heated on a steam bath for 2 hours. Without cooling, 330 ml. of water was added and then 43.5 g. sodium hydroxide pellets in 50 ml. of water was added to the reaction mixture which was then refrigerated for 2 days. The resulting crystals of 4,6-dihydroxy-m-benzene disulfonic acid disodium salt were filtered and dried under vacuum.

Example III

To a one-liter flask 120° g. of concentrated sulfuric acid was added. With cooling water on the flask to maintain the temperature between 20 to 22° C., 60 g. of hydroquinone was slowly added to the acid. The cooling water was turned off and the reaction mixture was stirred for 6 minutes at 24° C., 11 minutes at 27° C., 21 minutes at 31° C., and 41 minutes at 30° C. The mixture was then heated on a steam bath for 2½ hours. 222 g. 30% oleum was added over ½ hour. The reaction mixture was then stirred without heating for 2 hours and then heated on the steam bath for 2 hours at 90° C. After cooling for 2 days, 325 ml. of water was added and the temperature rose to 70° C. Then 43.5 g. of sodium hydroxide dissolved in 45 ml. of water was added and the reaction mixture was refrigerated overnight. he resulting crystals were a mixture of 2,5- and 2,6-dihydroxy-p-benzenedisulfonic acid disodium salts and they were filtered and washed with 400 cc. of ethanol, filtered, and washed again with 500 cc. of ethanol and filtered again. The crystals were dried overnight in a warm air oven at 40° C. and then under vacuum for 4 hours at 40–60° C.

The invention has been described in detail with particular reference to preferred embodiments thereof, but it will be understood that variations and modifications can be effected within the spirit and scope of the invention.

I claim:

1. A process for preparing dialkali dihydroxybenzene disulfonates comprising the steps of:
    (a) dissolving a dihydroxybenzene in concentrated sulfuric acid;
    (b) adding fuming sulfuric acid to the dihydroxybenzene sulfuric acid mixture to obtain a strongly acidic mixture, the amount of said sulfuric acid being sufficient to form said disulfonate;
    (c) raising the temperature of said acidic mixture to about 60° C. to about 90° C.;
    (d) diluting said acidic mixture by introducing water thereto;
    (e) reacting said mixture with an alkali metal hydroxide, the amount of said hydroxide being just sufficient to cause crystals of dialkali dihydroxybenzene disulfonate to precipitate from said mixture; and
    (f) heating said mixture to hydrolyze any sulfate ester.

2. A process according to claim 1 wherein said hydroxide is sodium hydroxide.

3. A process according to claim 1 wherein said dihydroxybenzene is selected from the group consisting of 1,2-dihydroxybenzene, 1,3-dihydroxybenzene and 1,4-dihydroxybenzene.

4. A process according to claim 1 including the step of separating the crystals from the mixture.

5. A process for preparing 3,5-disodium pyrocatechol disulfonate comprising the steps of:
    (a) dissolving pyrocatechol in concentrated sulfuric acid to obtain an acidic solution;
    (b) adding fuming sulfuric acid to said acidic solution to obtain a strongly acidic solution, the amount of said sulfuric acid being sufficient to form said disulfonate;

(c) raising the temperature of said acidic solution to about 60° C. to about 90° C.;
(d) diluting said acidic solution by introducing water thereinto;
(e) reacting said strongly acidic solution with sodium hydroxide, the amount of said sodium hydroxide being just sufficient to cause crystals of 3,5-disodium pyrocatechol disulfonate to precipitate from said solution;
(f) heating said solution to hydrolyze any sulfate ester; and
(g) recovering said crystals of 3,5 - disodium pyrocatechol disulfonate.

References Cited

UNITED STATES PATENTS

| | | | |
|---|---|---|---|
| 3,547,988 | 12/1970 | Bean | 260—512 R |
| 2,326,578 | 8/1943 | Thuau | 260—512 R |
| 2,196,985 | 4/1940 | Flett | 260—512 R |

DANIEL D. HORWITZ, Primary Examiner